(12) United States Patent
Maher et al.

(10) Patent No.: US 12,381,854 B2
(45) Date of Patent: Aug. 5, 2025

(54) DATA MANAGEMENT SYSTEMS AND METHODS USING EXPLICIT PRIVATE NETWORKING TECHNIQUES

(71) Applicant: Intertrust Technologies Corporation, Berkeley, CA (US)

(72) Inventors: David Maher, Philadelphia, PA (US); Pierre Chavanne, Davis, CA (US); Julian Durand, Ladysmith (CA); Eric Swenson, Soquel, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 111 days.

(21) Appl. No.: 17/993,321

(22) Filed: Nov. 23, 2022

(65) Prior Publication Data

US 2023/0164124 A1 May 25, 2023

Related U.S. Application Data (60) Provisional application No. 63/283,099, filed on Nov. 24, 2021.

(51) Int. Cl.
 *H04L 9/40* (2022.01)
(52) U.S. Cl.
 CPC ................ *H04L 63/0428* (2013.01)
(58) Field of Classification Search
 CPC .................................... H04L 63/0428
 USPC ............................................. 726/4
 See application file for complete search history.

(56) References Cited

U.S. PATENT DOCUMENTS

| 9,319,220 | B2* | 4/2016 | Grewal | H04L 63/061 |
| 9,973,535 | B2* | 5/2018 | Maher | H04L 63/20 |
| 11,283,832 | B2* | 3/2022 | Endler | G06F 21/45 |
| 2010/0241595 | A1* | 9/2010 | Felsher | G16H 10/65 |
| | | | | 707/E17.014 |

(Continued)

FOREIGN PATENT DOCUMENTS

| WO | 2015123678 | 8/2015 |
| WO | 2018190983 | 10/2018 |
| WO | 2019102213 | 5/2019 |

OTHER PUBLICATIONS

International Search Report Issued in International Application No. PCT/US2022/050896 dated Jun. 1, 2023 (4 pgs).

(Continued)

*Primary Examiner* — Dant B Shaifer Harriman
(74) *Attorney, Agent, or Firm* — John P. Davis; Thayne and Davis LLC (57) ABSTRACT

This disclosure relates to, among other things, managing data communicated between systems, services, and/or devices using explicit private networking techniques that provide relatively robust end-to-end security. In some embodiments, explicit private networking techniques may protect data in transit and/or as at rest and/or in use in potentially hostile environments. In various embodiments, an explicit private networking techniques architecture may protect connected device data where and when it is generated by encrypting it and maintaining that protection until it is consumed in a trusted information platform and/or service that uses identity and access management services to identify, authenticate, and/or authorize permissions to read, modify, and/or collaborate with that data and/or control devices and/or issue associated device commands.

16 Claims, 5 Drawing Sheets

(56) References Cited

U.S. PATENT DOCUMENTS

| | | | |
|---|---|---|---|
| 2020/0137116 A1* | 4/2020 | Maher | G06F 21/6218 |
| 2021/0392136 A1* | 12/2021 | Modi | H04L 9/3234 |
| 2022/0255931 A1* | 8/2022 | Avetisov | H04L 63/0442 |
| 2022/0311609 A1* | 9/2022 | Rao | H04L 9/0618 |
| 2023/0028642 A1* | 1/2023 | Li | H04L 63/168 |
| 2023/0128367 A1* | 4/2023 | Iila | H04L 67/52 |
| | | | 726/1 |
| 2023/0252181 A1* | 8/2023 | Nagao | H04L 9/0643 |
| | | | 713/164 |

OTHER PUBLICATIONS

Written Opinion Issued in International Application No. PCT/US2022/050896 dated Jun. 1, 2023 (8 pgs).
Official Communication Issued by the EPO dated Jul. 2, 2024 in EP Application No. 22840427.3--1218 (3 pgs).

* cited by examiner

DATA MANAGEMENT SYSTEMS AND METHODS USING EXPLICIT PRIVATE NETWORKING TECHNIQUES

RELATED APPLICATION(S)

This application claims the benefit of priority under 35 U.S.C. § 119(e) to U.S. Provisional Patent Application No. 63/283,099, filed Nov. 24, 2021, and entitled "DATA MANAGEMENT SYSTEMS AND METHODS USING EXPLICIT PRIVATE NETWORKING TECHNIQUES," the contents of which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing data communicated between systems, services, and/or devices. More specifically, but not exclusively, the present disclosure relates to managing data communicated between systems, services, and/or devices using explicit private networking techniques that provide relatively robust end-to-end security.

As the number of sensor and actuator-based systems and/or devices connected to the internet increases, so do the security challenges associated with them. Such systems and/or devices may be generally referred to in certain instances as connected devices and/or "things" that, when communicatively connected with other systems, devices, and/or services, become part of the Internet-of-things ("IoT"). The proliferation of connected devices has led to the development of protocols for wide area networks, neighborhood area networks, local area networks, and/or personal area networks, most primarily designed and implemented to address challenges associated with the security of connected devices.

Many connected devices have relatively small size, are designed for low power consumption, and take advantage of relatively inexpensive hardware. These considerations also influence network parameters associated with such devices. Because of this, many connected devices have relatively low compute and/or data throughput requirements (e.g., allowing some devices to be deployed with only intermittent network connectivity).

Connected devices may be intended to be "secure," but that notion of security often takes a backseat to minimizing cost and/or power consumption and battery life. Security challenges are further exacerbated by connected things tending to be highly distributed, decentralized, and/or physically available to attackers, creating a large attack surface even for simple non-mission critical applications. For consumer IoT devices, another issue is that many manufacturers may not have the incentive or capabilities to integrate effective security into their devices. This low threshold leads to increased opportunities for attackers, and a lower cost of attack may lead to a higher probability of attacks.

Many IoT devices and systems manage mission critical real time systems such as oil and gas pipelines, electricity grids, semi-autonomous vehicles, and building systems. Because of the efficiencies they introduce, these "professional" IoT systems are proliferating, making them an ever-increasing target for cyberattacks. Many of the protocols used in the IoT today, however, simply were not designed with today's threat model in mind. This model now includes nation state attackers waging cyberwar and well-funded and technically adept criminal gangs operating under the protection of an aggressor nation states.

In some instances in the IoT space, there may be networked protocols in use that do not have robust intrinsic security. Moreover, hardware implementing such protocols may have limited to no hardware protection capabilities. For example, a controller area network ("CAN") bus in a vehicle may not implement a notion of identity for component communication and/or authentication, allowing a compromised vehicle infotainment system under attack to potentially issue instructions to more critical connected systems (e.g., braking systems). Many Supervisory Control and Data Acquisition ("SCADA") systems that form the mission critical backbone of utilities may use the Modbus communication protocol. Modbus, however, does not conventionally implement robust authentication capabilities.

The power grid is perhaps one of the largest machines in the world; however it may also be one of the most fragile. Moving from a hierarchically controlled system to a hyper-connected cyber-physical market-driven system with precise, near-instantaneous supply and demand synchronization requires a rigorous attention to secure system design. The benefits of large-scale smart grids may be at risk of not being fully realized until we have a truly secure, trustworthy, and decentralized infrastructure for IoT devices that may allow many resources to be safely, optimally, and promptly used when they come online, while also being protected from risks associated with nefarious actors.

Securing connected devices within the IoT presents a myriad of challenges and/or security constraints including, for example and without limitation, relatively inexpensive hardware with potentially limited secure hardware and/or software resources (e.g., secure enclaves), connected devices that are intermittently connected with low persistence, devices that may be widely distributed and/or more physically accessible thereby creating a larger attack surface, the use of multiple network topologies and/or networks, mesh-based edge networks where device data is collected at a head end and then communicated via a provider network before being received by a cloud-based IoT management system and/or service, and/or fragmented networks that involve relatively complex technical and/or administrative bridging between operational and/or information technology divides.

Embodiments of the disclosed systems and methods enable secure management and/or communication of data between connected devices, systems, and/or associated services. In some implementations, embodiments of the disclosed systems and methods may ameliorate various security concerns and/or challenges associated with IoT networks and connected devices, as described herein.

Consistent with various disclosed embodiments, data communicated between systems, services, and/or devices may be managed using explicit private networking techniques ("EPN") that provide relatively robust end-to-end security. EPN techniques consistent with embodiments disclosed herein may use secure cryptographic key establishment protocols in architectures that potentially include many-to-many relationships. In some embodiments, EPN techniques may protect data in transit and/or at rest and/or in use in potentially hostile environments. In further embodiments, data protected using EPN techniques may be encrypted and/or decrypted in trusted and/or otherwise protected processing environments. Various embodiments of the security infrastructure described herein may enable reliable, fluid, low-latency, and/or automated market mechanisms using, for example and without limitation, network independent EPNs, advanced attribute-based identity management, and/or authenticated and authoritative mechanisms for data and control.

In certain embodiments, IoT devices may pair with digital twins so that the operative devices remain simple, focused, and/or responsive. In some embodiments, their digital twins may employ artificial intelligence mechanisms that detect and share anomalies and threats, continually upgrade device security, and/or employ self-healing strategies. In further embodiments, digital twins may be used to allow authorized users to access and/or manipulate data from associated IoT devices, while keeping the associated devices behind firewalls, and therefore not directly accessibly. This may allow a less secure device to communicate via an EPN with an EPN service and an associated digital twin, without being directly accessible to users and/or potential nefarious actors.

Various embodiments of the disclosed systems and methods may also comprise and/or otherwise interact with a responsive, distributed trust management infrastructure that authenticates attributes of devices, services, data feeds, and/or software components. Users may access and/or manipulate data from IoT devices, and certain embodiments disclosed herein may allow for authenticating such users and for implementing robust access control of the interactions between actors (e.g., users and/or programs) in the EPN ecosystem. Embodiments of this disclosure further describe an interoperable infrastructure that may enable participation from suppliers of devices and/or services.

BRIEF DESCRIPTION OF THE DRAWINGS

The inventive body of work will be readily understood by referring to the following detailed description in conjunction with the accompanying drawings, in which.

DETAILED DESCRIPTION

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

The trustworthiness and/or usefulness of modern IoT systems may depend, at least in part, on the data that they generate and consume being highly trusted. Unlike certain conventional methods of protecting IoT data, EPN techniques consistent with certain embodiments of the disclosed systems and methods may provide data integrity, authentication, and/or confidentiality from data generation to consumption and back again. Certain conventional IoT system protection mechanisms may involve the use of network-based link protection, from Zigbee mesh field area networks to WIFI to Bluetooth, that usually are deployed insecurely and may only provide protection of the link but may not necessarily provide data protection through the life cycle of data. Transport Layer Security ("TLS") and Virtual Private Networks ("VPNs") may be somewhat better, but may only protect data in transit, not at rest. In certain implementations, EPN techniques consistent with various disclosed embodiments may offer true end-to-end protection, potentially without the performance penalties of asymmetric cryptographic systems used in traditional digital signatures, authentication (e.g., X.509 certificate verification), and/or public key cryptographic techniques used in providing confidentiality. In some implementations, technologies that use short-lived symmetric keys may be used.

Embodiments of the disclosed systems and methods implementing EPN techniques may help address a variety of data management problems and/or concerns associated with conventional solutions. EPN techniques may, for example and without limitation:

Reduce malicious and/or accidental modification and/or spoofing of data.

Improve security of data relative to conventional IoT networking protocols (e.g., ModBus and/or CAN bus with no ability to authenticate and/or identify devices and/or ZWAVE and/or Zigbee with limited security functionality).

Provide better end-to-end protection when compared with protocols that only consider a particular section of "pipe."

Address information technology/operational technology convergence challenges. Data traversing from a wide range of field area networks with many devices from different vendors poses highly complex data management problems, where trusting the authenticity and/or integrity of data is challenging in the heterogenous environment. Embodiments disclosed herein may provide a common root of trust across this complexity, allowing for management of fragmented trust systems under a conceptual "single pane of glass."

Embodiments of the disclosed systems and methods may provide a mechanism for ensuring data is protected when communicated to, from, and/or between connected devices, the cloud, and/or other devices, systems, and/or services using EPN techniques. EPN techniques consistent with embodiments disclosed herein may protect IoT data where and when it is generated by encrypting it and maintaining that protection until it is consumed in a trusted information platform and/or service that uses identity and access management ("IAM") services to identify, authenticate, and/or authorize permissions to read, modify, and/or collaborate with that data. In some embodiments, permissions may also be employed to, among other things, determine what data and/or commands may be sent to a device, determine what data may be read from a device, with possible filtering of that data based on applicable rules and/or policies, and/or to restrict access to secret information used to communicate such data and/or commands in a trusted fashion, and/or the like.

Explicit Private Networks Overview

Connected devices may generate data (e.g., via one or more associated sensors) and/or operate as data sources in a variety of contexts, applications, and/or use cases. Connected devices may further act as actuators that control and/or otherwise instruct other devices, systems, and/or services to engage in certain actions. For example and without limitation, a connected device may turn off a large electricity load (e.g., air condition units) at certain times in response to peak demand information associated with an electricity grid.

To maintain trust, privacy, safety, and/or security ("TPSS") in connection with connected device networks, various embodiments disclosed herein may leverage trusted endpoints, which may be located at the network edge and/or in the cloud. Consistent with embodiments disclosed herein, EPN techniques may be used to protect data as it passes through one or more untrusted gateways and/or networks between trusted endpoints. This trust may be leveraged to protect the data as it travels over data networks and reaches the cloud.

In various examples and/or embodiments described herein, certain network connections and/or intermediate gateways, systems, devices, and/or services and/or endpoints may be described as being "trusted" and/or "untrusted." It will be appreciated, however, that such trust may be relative, with trust being considered from the perspective of a particular endpoint. For example, a network connection and/or a gateway may have certain network and/or security protections in place, but from the perspective of an endpoint originating and/or receiving data via the network connection and/or gateway, the network connection and/or gateway may not necessarily be trusted. Similarly, an endpoint originating data may trust a network connection and/or associated intermediate service, but a receiving endpoint may not share this trust. Therefore, despite one endpoint considering the network connection as being "trusted," because the trust is not shared with both endpoints, the network connection may be considered "untrusted."

Moreover, it will be appreciated that trust in a network connection and/or associated intermediate gateways, systems, devices, and/or services may depend at least in part, on a type of data and/or operation being communicated over the network connection and/or via the intermediate gateways, systems, devices, and/or services and/or other contextual information. For example, and endpoint may trust a network connection with respect to data having relatively low security implications, but such trust may not extend to certain other data having higher security demands (e.g., device actuation commands). In this manner, trust in a network connection and/or gateway may depend, at least in part, on a type of data being communicated over the connection and/or other contextual considerations. In view of the above, it will be appreciated that the terms "trusted" and/or "untrusted" may be used to describe whether an endpoint trusts a network connection and/or associated intermediate gateways, systems, devices, and/or services, potentially in consideration of a particular type of data being communicated and/or various other contextual information.

Consistent with embodiments of the disclosed systems and methods, EPN techniques may address a number of design considerations including, for example and without limitation, one or more of:

User Centric System Properties. As EPN ecosystems proliferate and grow, their complexity may increase. TPSS properties associated with various connected devices and/or associated systems and/or services may operate as system level attributes that allow for user review, interaction, and/or verification. In certain embodiments, augmented intelligence may be used to manage EPN ecosystems at scale.

Organic Growth. In certain embodiments, EPN ecosystems may accommodate relatively rapid evolution and growth. New entities (e.g., connected devices) may be added to a network, while ensuring that existing entities that rely on new entities understand the TPSS implications of adding a new entity.

Maintenance. In various embodiments, changes to an EPN ecosystem and/or aspects thereof and/or failures may be identified relatively quickly, allowing for prompt and reliable maintenance, updating, and/or adaptation.

Simplicity and Relatively Low Overhead. As noted above, certain connected devices participating in an EPN ecosystem may be relatively low capability devices. To improve the effectiveness of trust management, trust may be delegated and/or otherwise distributed to devices and/or entities that have increased capacity for implementing TPSS considerations.

Support for Legacy Entities. In some circumstances, certain connected devices may have legacy properties that may be accommodated to participate in the EPN ecosystem and implement TPSS considerations. Various embodiments of EPN ecosystems consistent with embodiments disclosed herein may be adapted to support legacy entities.

Performance, Flexibility, and/or Scale. Embodiments disclosed herein may implement EPN and facilitate TPSS without significantly impacting the performance of associated devices, systems, and/or services and/or the ability to grow an EPN ecosystem.

Interoperability. In various embodiments, different entities may be allowed to contribute to and/or become part of the EPN ecosystem and constructively interact with relatively minimal and/or otherwise straightforward adaptation to participate.

Explicit Private Network Implementation Concepts and Entities

Various embodiments of the disclosed systems and methods may include and/or otherwise involve a variety of policies, data, models, actions, and/or entities. For example and without limitation, an EPN ecosystem may include and/or otherwise involve one or more of the following implementation concepts, policies, data types, models, actions, and/or entities:

Policies. Policies may represent a set of rules that may drive decisions regarding an entity's behavior, permissions, and/or authority to act in connection with TPSS determinations.

Control Action. A control action may represent an action that can make a connected device engage in an action and/or otherwise "do something." This may include, for example and without limitation, allowing access to data and/or a resource.

Intrinsic Data. Intrinsic data may comprise device state information including, for example and without limitation, current state, past state, future state, and/or other fact information about a connected device and/or a thing.

Extrinsic Data. Extrinsic data may comprise data acquired and/or otherwise generated by a connected device using one or more associated sensor systems. In some embodiments, extrinsic data may comprise data relating to an environment proximate to a connected device.

Trust Model. Consistent with embodiments disclosed herein, a trust model may provide a formal description of how different entities and/or components of an ecosystem rely on one another to act and/or authorize actions and/or to maintain specific attributes and/or capabilities in certain contexts. In some embodiments, a trust model may include delegation whereby an entity may grant and/or cede authority to others.

Device Manufacturer. A device manufacturer may produce a connected device. In some embodiments, connected devices may be shipped with a "factory configuration" that may include a default and/or initial policy, settings, and/or other configurations.

Device Owner. A device owner may take control of a device and/or establish a root policy to manage access to a device's resources. In some embodiments, a root policy may be used in connection with a device's reference monitor.

Delegate. A delegate may comprise an entity that has been delegated authority by another entity to make decisions about access to resources.

Controller. A controller may comprise a connected device that can control another connected device's action. Users and/or programs and/or associated systems may further operate as controllers.

Security Association. A security association may define access permissions between connected devices, users, and/or programs. For example and without limitation, in a given connected device, a security association may comprise an entry in a table that lists other entities that may be conditionally permitted to have access to resources provided by a given connected device. In some embodiments, an entry may list an entity ID, associated cryptographic parameters, one or more explicit permissions, and/or other attributes that may be used by a policy evaluator to determine permissions by referencing device state and/or device attributes.

Reference Monitor. A reference monitor may be part of a system that filters action requests and/or determines how to respond to those requests by applying policy that can reference the resource(s) named in the request, the system state, the requestor's ID, and/or a security association between the system and the requestor. In some embodiments, requests may be subject to authentication using cryptographic parameters listed in an associated security association. If permitted, a response to a request may be protected using cryptographic parameters listed in the security association.

Digital Twin. A digital twin may comprise a virtual digital copy and/or representation of a physical connected device and/or system. In some embodiments, a virtual twin may have additional resources available to it when compared to a corresponding physical device and/or system. A digital twin may be stored and/or otherwise managed by a cloud service and/or another service point (e.g., a gateway). In at least one non-limiting example, this may allow a digital twin to serve as an proxy for the associated device and/or system but use additional security resources to isolate the device and/or system from harm and/or to better screen the device and/or system from nefarious actors. In some embodiments, this may allow a connected device to have a highly secure association with a corresponding digital twin, allowing for placing much of the burden of a reference monitor on the digital twin, especially in connection with applications, contexts, and/or use cases that do not require low latency.

Various entities associated with the disclosed systems and methods (e.g., connected devices, users, programs, and/or associated systems and/or services) may, in certain contexts, be conceptually viewed as sources and/or destinations. For example and without limitation, a connected device may be a source of data (e.g., data generated by one or more sensor systems of the connected device), and a cloud service associated with the connected device may be destination for the data. It will be appreciated that, depending on the context, a device, system, and/or service may operate as both a source of data and also a destination for data issued by one or more other devices, systems, and/or services.

Moreover, although generally described in certain instances herein as "sources" and/or "destinations" of data, it will be appreciated that such data may comprise a command and/or action. Thus, source devices, systems, and/or services may function and/or otherwise operate as actuators, issuing commands to one or more destination devices, systems, and/or services that may, depending on the context, engage in certain actions as directed by the received commands. Depending on the context, a device, system, and/or service may operate as both an actuator of other devices, systems, and/or services, as well as operate as a destination for such commands.

Figure 1:
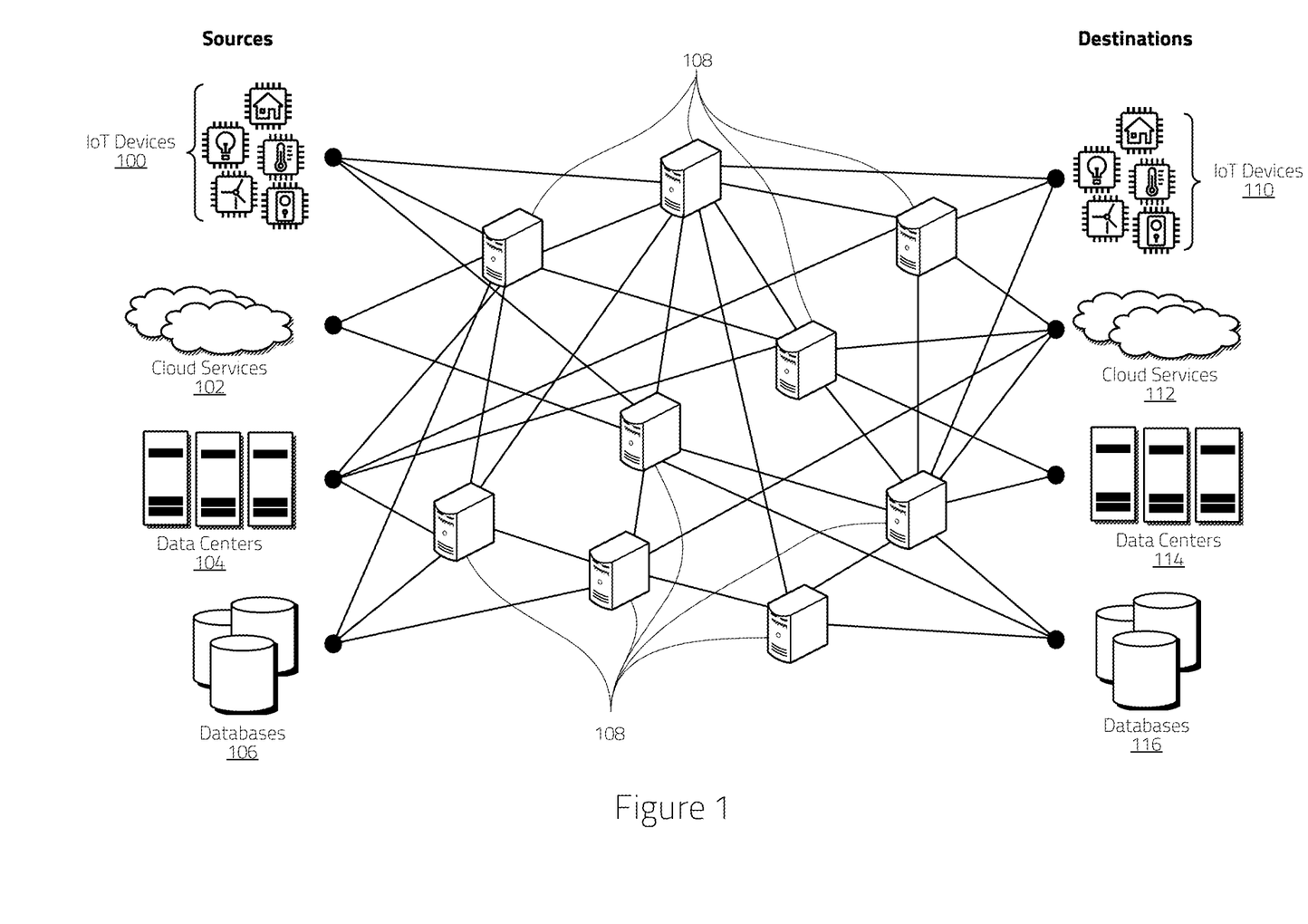
FIG. 1 illustrates a conceptual diagram showing a non-limiting example of various sources and destinations of data in a data management ecosystem consistent with certain embodiments disclosed herein.

FIG. 1 illustrates a conceptual diagram showing a non-limiting example of various sources 100-106 and destinations 110-116 of data in a data management ecosystem consistent with certain embodiments disclosed herein. As illustrated, sources of data may comprise, for example and without limitation, one or more connected devices 100, one or more cloud services 102 and/or associated systems, one or more data centers 104 and/or other data stores, one or more databases 106, and/or any other device, system, and/or service that may generate, store, and/or otherwise provide data for access by one or more data destinations. Similarly, destinations for data may comprise, for example and without limitation, one or more connected devices 110, one or more cloud services 112 and/or associated systems, one or more data centers 114 and/or other data stores, one or more databases 116, and/or any other device, system, and/or service that may receive, use, access, and/or otherwise be a destination for data generated and/or provided by one or more data sources.

It will be appreciated that a variety of other types of sources and/or destinations may be included in a data management ecosystem consistent with certain embodiments disclosed herein. For example and without limitation, although not specifically illustrated in connection with FIG. 1, users and/or applications may operate as actors in an EPN ecosystem as sources and/or destinations. As discussed in more detail below, users and/or applications may, for example and without limitation, access and/or manipulate data generated by connected devices, produce derived data from raw data generated by connected devices, issue commands to control connected devices, and/or the like.

As noted above, depending on the context, a device, system, and/or service may operate as both a source of data and also a destination for data issued by one or more other devices, systems, and/or services. For example and without limitation, a connected device 100 may be a source of data provided to one or more other connected devices, systems, stores, and/or services, but may also be a destination for data generated by another connected device 110. Therefore, although sources and destinations in FIG. 1 are illustrated separately for the purposes of explanation and illustration, it will be appreciated that connected devices and/or associated systems, stores, services, and/or the like may operate as both data sources and destinations.

A wide variety of connected devices 100, 110 may be used in connection with the various disclosed embodiments. For example and without limitation, a connected device may comprise one or more of a computer system, a smartphone, a tablet computing system, a security system, a vehicle infotainment system, a streaming media device, a gaming device, an entertainment system, a networked lock, a thermostat, a furnace, an air conditioning system, an irrigation system, a water control system, a pump system, a utility meter, a network gateway, an activity sensor, a home alarm, an appliance, a vehicle and/or a component and/or subsystem of a vehicle, a mobile communication device, a wind turbine system, a solar panel system, an industrial manufacturing control system, and/or any other type of connected device and/or system. It will therefore be appreciated that the specific examples of connected devices 100, 110 and/or associated systems and/or sources 102-106 and destinations 112-116 described herein are to be viewed as illustrative for the purposes of facilitating understanding of the disclosed embodiments, and not in a limiting manner.

Data sources and destinations may be communicatively coupled via one or more network connections, which may comprise one or more intermediate devices, systems, and/or services 108. The intermediate devices, systems, and/or services 108 may include a variety of devices, systems, and/or services, which may include various computing systems, network infrastructure devices, gateways, and/or systems, and/or other connected devices. For example and without limitation, a connected device 100 may communicate sensor data to a destination cloud service 112 via a network that includes a number of intermediate network connections and/or nodes and/or supporting gateway systems. In another non-limiting example, a connected device 100 may communicate sensor data to another intermediate connected device (e.g., a hub or the like), which may communicate the sensor data to a destination cloud service 112. Although various embodiments illustrated in connection with FIG. 1 show sources and destinations being communicatively coupled via one or more intermediate devices, systems, and/or services 108, it will be further appreciated that data sources and destinations may be communicatively coupled via one or more direct network connections that do not necessarily include intermediate devices, systems, and/or services 108.

In certain circumstances, intermediate devices, systems, and/or services 108 and/or associated network connections may not necessarily be trusted and/or secured from the perspective of the endpoints and/or the trust and/or security of such devices, systems, and/or services 108 and/or associated network connections may not necessarily be known to the endpoints. Moreover, as discussed above, in certain embodiments, intermediate network devices, systems, and/ or services 108 and/or associated network connections may only be partially trusted (and thus not fully trusted) and/or only trusted in certain contexts (e.g., trusted in communicating certain low security data and/or the like). Consistent with embodiments disclosed herein, EPN techniques may be used to protect data as it passes through one or more untrusted intermediate devices, systems, and/or services 108 between trusted endpoints (e.g., trusted sources and destinations). In this manner, EPN techniques may allow for endpoints to communicate in a trusted way without necessarily relying on the trust of the network connections and/or intermediate devices, systems, and/or services 108.

Explicit Private Network Architecture and Ecosystem

Consistent with embodiments of the disclosed systems and methods, an EPN ecosystem may comprise one or more of a connected device, an EPN session manager service, an IoT service, an EPN secrets manager service and/or associated store, an EPN administrator service, a certificate authority, an IAM service, one or more web clients, and/or one or more applications, systems, services, and/or devices implementing aspects of an EPN using provisioned EPN device and/or server software development kits ("SDK").

In certain embodiments, a connected device may interact with a certificate authority as part of a device personalization process. For example and without limitation a device certificate including a public device key may be generated by the certificate authority and issued to a connected device. As discussed below, this certificate may be used in connection establishing EPN sessions.

Establishing trusted communication between a connected device and an EPN ecosystem may involve a session establishment process. Consistent with embodiments disclosed herein, as part of a session establishment process with an EPN session manager service, a connected device may become authenticated using a suitable authentication protocol. In some embodiments, a Station-to-Station ("STS") protocol may be used. Upon successful authentication, a shared session key may be established for communications between the connected device and an EPN session manager service. In certain embodiments, the certificate generated during the personalization process may be stored in EPN session data during session establishment.

Secure data communications between various connected devices and/or one or more applications and/or services may be achieved following the session establishment process. For example and without limitation, a connected device may interact with an IoT service managing a database, allowing the device to store, access, and/or otherwise use data stored in the database. In connection with such secure data communications, one end of the communication (e.g., a connected device and/or service) may create a secure envelope for data by encrypting it using a shared secret and/or signing it using a private or secret key. The other endpoint of the communication may decrypt the data using the shared secret and/or may verify the signature using the stored public key or secret key.

In certain embodiments, a secrets store associated with an EPN secrets manager service may be used as secure, durable, and/or tamper-proof storage for established EPN session data. EPN server SDKs in the EPN ecosystem may interact with the EPN secrets manager service to retrieve EPN session data from the secrets store for processing packet data. For example and without limitation, retrieved EPN session data may be used in connection with encrypting/decrypting and/or signing/verifying packet data. In some embodiments, communication with the EPN secrets manager may be made via secure and/or otherwise trusted network connections (e.g., TLS connections and/or the like).

A EPN session manager service may comprise a web service for establishing EPN sessions with EPN-enabled connected devices. In some embodiments, an EPN administrator service may interact with and/or otherwise leverage the EPN session manager service to provide a to list of configured security domains, which may be used to validate connected device group configurations.

The EPN session manager service may store successfully negotiated session data in a secrets store managed by an EPN secrets manager service. A variety of information may be included in stored EPN session data for an authenticated device including, for example and without limitation, one or more of:
A unique session ID.
A wrapped key, which may comprise a shared session secret wrapped by a security domain key corresponding to a security domain for the devices.
A client certificate.
An indication of a security domain.
Session expiration time information.
Protection mode information, which indicates whether session secret information may be used in connection with encryption/decryption and/or signature operations (or both).
A digest of the session data.

In various embodiments, EPN session data may be protected against tampering. When new EPN session data is stored in the secret store, its digest may be calculated and stored in the database. When session records are read, the digest may be re-calculated and verified against the stored digest value. In certain embodiments a blockchain and/or other trusted immutable ledger may be used to store and/or otherwise various digest values for verification purposes.

Various aspects of the disclosed embodiments may be implemented using one or more SDKs for building EPN capable client, device, and/or server applications. For example and without limitation, an EPN client SDK may provide a binary library for integrating EPN functionality into a connected device application. The EPN client SDK may support EPN session establishment through interacting with the EPN session manager service and/or generating EPN secure messages (which in certain embodiments may be referred to as EPN envelopes). In some embodiments, the EPN client SDK may be used to interact with the trust certificate authority service in connection with personalizing the connected device.

An EPN server SDK may integrate EPN functionality into a server and/or service applications. The EPN server SDK may support extracting messages from EPN secure envelopes that may include, for example and without limitation, encrypted data, signed data, and/or combination of signed and/or encrypted data. The EPN server SDK may further support creating an EPN envelope from a plain text message.

Consistent with embodiments disclosed herein, EPN techniques may be integrated into an IoT service. In at least one non-limiting example, the IoT service may comprise a trusted data management service managing access to data included in a time series database ("TSDB") generated by one or more connected devices. In some embodiments, the IoT service may function as a web proxy to redirect EPN communications from connected devices to a TSDB, managing access to the TSDB such that only authorized connected devices can store and query data in the TSDB and ensuring that any communications with the device are secure and/or trusted in an end-to-end manner.

An EPN ecosystem may further comprise an EPN administrator service. The EPN administrator service may comprise a web service that may be used to manage device and/or device group configurations. In some embodiments, such device and/or group configuration information may be stored and/or otherwise managed in a configuration store managed by the EPN administrator service. In some embodiments, the EPN administrator service may leverage a IAM service in connection with governing access to devices and/or group configurations. Through this interaction, only authenticated users (and/or associated devices) with relevant privileges may create, view, modify, and/or delete EPN administrator device group objects.

In certain embodiments, connected devices may be authenticated during the EPN session establishment process. A connected device may present a certificate as part of the authentication process from a trusted certificate authority service (e.g., trusted directly and/or indirectly via trust anchors in a trust store).

In some embodiments, security partitioning techniques may be employed, where connected devices may be configured as part of a security domain, allowing devices from multiple organizations to interoperate. Each security domain may leverage a different key to protect session data for devices within the security domain. Devices may be configured into one or more device groups, which may be identified by an associated ID included in a certificate. IDs included in a certificate may be verified during an EPN session establishment to determine which device groups a device belongs to.

Figure 2:
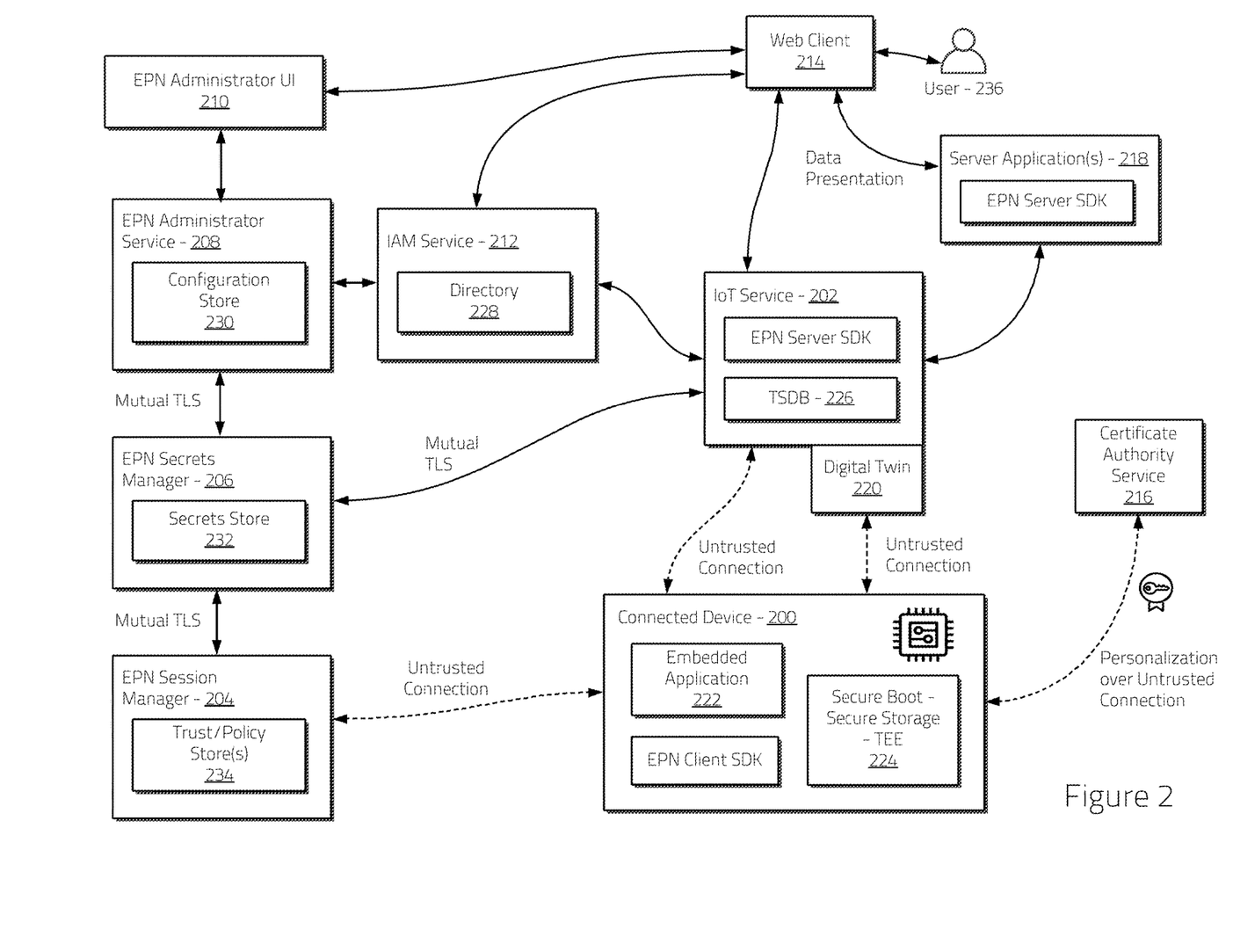
FIG. 2 illustrates a diagram of a non-limiting example of an explicit private network system architecture consistent with certain embodiments disclosed herein.

FIG. 2 illustrates a diagram of a non-limiting example of an EPN system architecture consistent with certain embodiments disclosed herein. Among other things, the illustrated architecture shows interactions that may occur as part of a connected device 200 personalization process, a session establishment process between a connected device 200 and a EPN session manager service 204, secure communications with an IoT service 202, processes for accessing secrets from a secret store 232 using an EPN secrets manager service 206, and/or interactions between an IoT service 202 and an IAM service 212.

In certain embodiments, the connected device 200 may comprise a protected, secure, and/or otherwise trusted execution environment ("TEE") 224. In certain embodiments, the TEE 224 may be implemented using secure hardware and/or software components and may be configured to perform sensitive operations such as, for example and without limitation, cryptographic operations, secure policy and/or data management, and/or other aspects of the disclosed embodiments. Among other things, the TEE 224 may provide secure boot and/or secure storage functionality to the connected device 200.

In some embodiments, the TEE 224 may be established and/or otherwise configured on the connected device 200 using a EPN client SDK. Among other things, the EPN client SDK may facilitate personalization and/or credentialing of the connected device 200, session establishment, and/or secure message handling functions. As illustrated in connection with FIG. 2 and detailed herein, implementing EPN functionality within the connected device 200 may allow for the device to communicate with other systems and/or services over untrusted network connections in a relatively secure manner.

The connected device 200 may be configured at the factory or via a personalization, configuration, and/or initialization process that may use a shared secret which may be used to identify the device 200. In certain embodiments, the shared secret may be unique to the connected device 200. In further embodiments, the shared secret may be shared among a group of devices.

For example and without limitation, as part of a personalization process, the connected device 200 may generate an asymmetric key pair. The connected device 200 may send a shared secret and the public key to a certificate authority 216, which may operate as a cloud-based service. The certificate authority 216 may generate and return a public key certificate and/or token to the connected device 200. In certain embodiments, the returned certificate and/or token may serve as identity for the connected device 200 within the EPN ecosystem in connection with various interactions disclosed herein. In further embodiments, other device personalization processes and/or techniques may be used including, for example and without limitation, FIDO device onboarding ("FDO") processes.

In some embodiments, the TEE 224 may be involved in the personalization process of the connected device 200 with the certificate authority 216. For example, the TEE 224 may provide a secure and/or otherwise protected environment in which to generate and/or store secret information such as private keys.

Before interacting with the various other components of the EPN ecosystem, the connected device 200 may contact the EPN session manager service 204 to establish an EPN session. In some embodiments, the connected device 200 may interact with the EPN session manager service 204 over an untrusted connection. For example and without limitation, the connected device 200 may communicate identification information that may include the public key certificate to the EPN session management service 204 along with a session initiation request. This interaction may result in a symmetric session key being generated by the EPN session manager service 204 and issued to the connected device 200 that may be used by the connected device 200 in connection with securing communications within the EPN ecosystem.

Once the connected device 200 has established an EPN session, the EPN client SDK of the connected device 200 may store the session key in secure storage of the TEE 224. The connected device 200 may then use the EPN session key to facilitate secure communications with other endpoints in the EPN ecosystem. For example and without limitation, the connected device may communicate with the IoT service 202 to access data stored in a TSDB store 226 managed by the IoT service 202. Communications issued from the connected device 200 may be encrypted and/or signed using the EPN session key, providing security and/or integrity despite an associated communication channel being potentially insecure and/or untrusted. Although various embodiments and examples described herein may use an EPN session key in connection with achieving secure communications over insecure and/or untrusted channels, it will be appreciated that, in further embodiments, a key generated and/or otherwise derived from the EPN session key may be used.

As discussed in more detail below, in certain embodiments, a connected device 200 may communicate using the EPN session key (and/or a key derived therefrom) with a digital twin 220. A digital twin 220 may comprise a virtual digital copy and/or representation of the connected device 200 (potentially with additional resources available to it). In certain embodiments, the digital twin 220 may be accessible to authorized applications (e.g., a web client 210) and/or users 236, with access managed using governance capabilities of the IoT service 202 and the IAM service 212.

In certain embodiments, the digital twin 220 may be offered as part of the IoT service 202, with interactions with the digital twin managed by queries and responses issued to the IoT service 202. In further embodiments, the digital twin 220 may be offered via one or more separate systems and/or services.

The EPN session manager service 204 may communicate with an EPN secrets manager service 206 via a secure channel. For example and without limitation, in some embodiments, the EPN session manager service 204 may communicate with the EPN secrets manager service 206 via a channel secured using mutual TLS. The EPN secrets manager service 206 may manage an associated secrets store 232, where EPN session keys established between the connected device 200 and the EPN session manager service 204 may be secured stored, associated, and/or managed.

A user 236 (and/or an associated device and/or system associated with the user 236) of an application, such as web client 210, may authenticate with the IAM service 212, which may manage an access control directory 228. Once authenticated, the user 236 may receive an access token from the IAM service 212. The received access token may be used by the user 236 for authentication and facilitate communication with an EPN administrator user interface ("UI") 210 and/or applications that have been built using an EPN server SDK.

The EPN administrator UI 210 may allow authorized users and/or applications to manage the connected device 200 and/or other connected devices and/or things within the IoT ecosystem. The EPN administrator UI 210 may interact with an EPN administrator service 208 which may, among other things, manage a store 230 that stores connected device configuration information (e.g., configuration information associated with connected device 200). The EPN administrator service 208 may call upon the IAM service 212 and/or the EPN secrets manager service 206.

In certain embodiments, groups of connected devices may be defined, which may result in group symmetric keys being created and stored by the EPN secrets manager service 206 (e.g., in secrets store 232). Certain functions of the EPN secrets manager service 206 may, in some embodiments, be accessible to the EPN administrator service 208. In some embodiments, the EPN administrator service 208 may perform access checks with the IAM service 212 to determine whether a given user is allowed to manage devices and/or device groups.

A user and/or associated system 236 may engage with various services via an application, which in some embodiments may comprise a web client 214. For example, the user and/or an associated system 236 may use a web client 214 to interact with one or more applications 218, the IoT service 202, the IAM service 212, and/or the EPN administrator UI 210. In further embodiments, the user and/or associated system 236 may engage with services directly. In certain embodiments, the user and/or associated system 236 may interact with the IoT service 202 (e.g., either directly and/or via web client 214) to query data collected by the connected device 202 that may be managed in the TSDB 226. The IoT service 202 may apply data governance (e.g., via rules and/or privileges provided by the IAM service 212) to manage access to such data.

In various embodiments, services (e.g., IoT service 202) may expose APIs, which may be invoked via the web client 214 and/or by other clients, applications, services, systems, and/or devices. For example, in certain embodiments, non-web client scripts, applications, and/or command line interactions may be used to invoke APIs exposed by the IoT service 202.

To send commands to a connected device 200 on behalf of a user and/or an associated system 236, the IoT service 202 may engage with the EPN secrets manager service 206 to retrieve an appropriate session and/or group key for the connected device 200. In certain embodiments, this operation may also be governed, leveraging the rules and/policies maintained in the directory 228 of the IAM service 212 to determine whether a requesting user and/or system 236 is allowed to perform a specified operation on the connected device 200. If allowed, the IoT service 202 may leverage an embedded EPN server SDK to encrypt, sign, decrypt, and/or verify message between itself, the connected device 200, and/or its digital twin 220.

Although various services and/or components shown in FIG. 2 are illustrated as separate services and/or components of the IoT ecosystem, it will be appreciated that certain services and/or components may be implemented by a single system and/or service and/or any suitable combination of systems and/or services. For example and without limitation, in some embodiments, the EPN session manager service 204, EPN secrets manager service 206, EPN administrator service 208, and/or EPN administrator UI 210 may be implemented by a single service providing certain EPN functionality.

Figure 3:
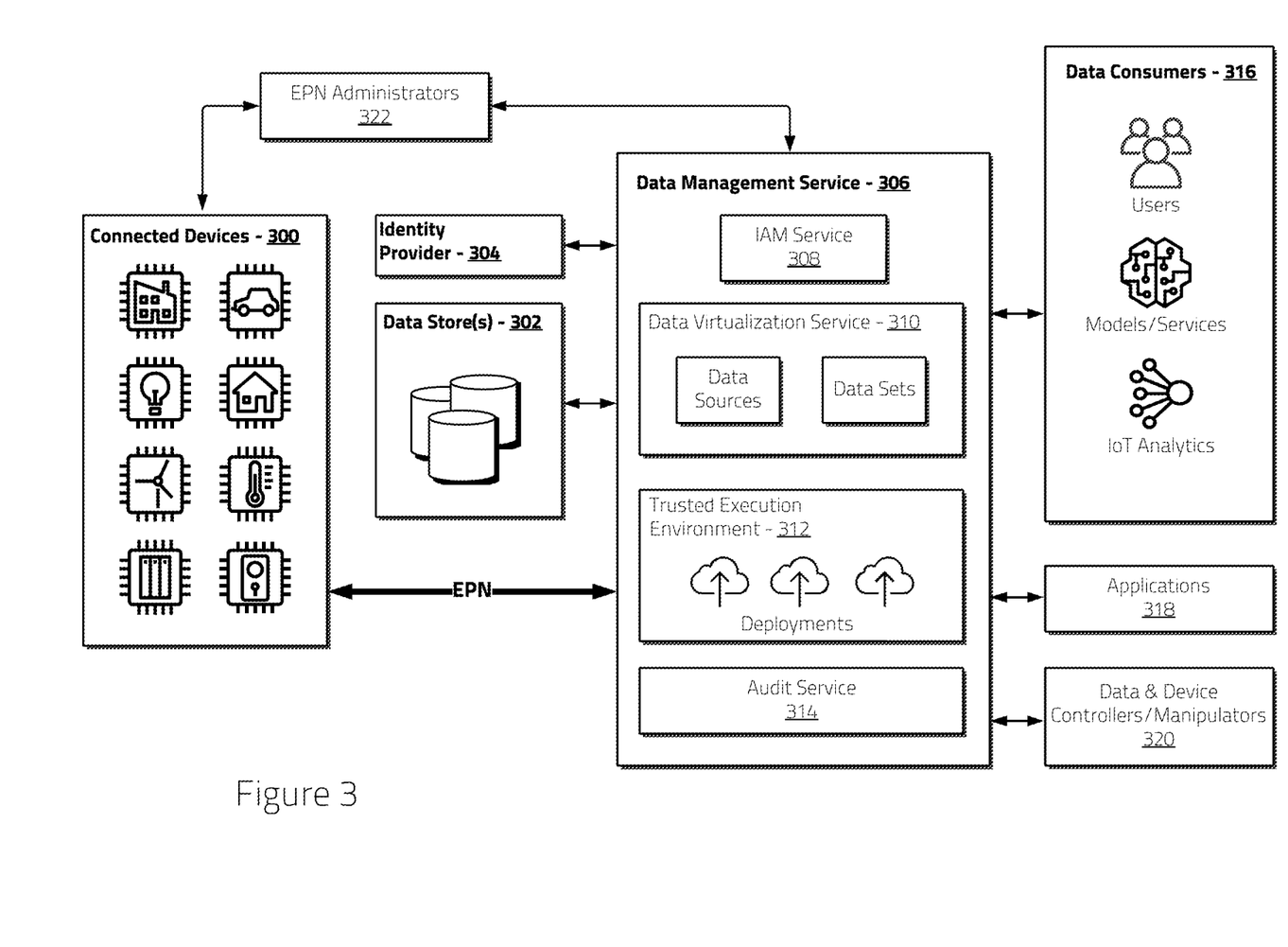
FIG. 3 illustrates a diagram of a non-limiting example of an explicit private network ecosystem consistent with certain embodiments disclosed herein.

FIG. 3 illustrates a diagram of a non-limiting example of an explicit private network ecosystem consistent with certain embodiments disclosed herein. Consistent with embodiments disclosed herein, one or more connected devices 300, which may comprise for example and without limitation any of the types of connected devices detailed herein, may be personalized and registered with an EPN network via personalization and EPN session establishment processes. The EPN network may comprise a data management service 306 and/or one or more data stores 302. In some embodiments, the EPN network may further comprise one or more external identity providers (e.g., Active Directory Federation Services ("ADFS"), Open ID/Connect, OAuth2, Security Assertion Markup Language ("SAML"), Lightweight Directory Access Protocol ("LDAP"), and/or the like).

Applications 318 and/or data consumers 316, which may comprise, for example and without limitation, users, services, models, IoT analytics channels, and/or the like, may interact with the EPN network to view, modify, analyze, and/or otherwise view data collected from and/or generated by connected devices 300. In further embodiments, applications 318 may also process the data to generate models and/or derived data. Generated models and/or derived data may be stored and/or otherwise managed by a data virtualization service 310.

In some embodiments, data consumers 316 and/or applications 318 may have their access to data governed via rules and/or policies managed by an IAM service 308 and/or the data virtualization service 310, which in some embodiments may be services offered by the data management service 306 (although may also be implemented by separate services that interact with the data management service 306).

The data stores 302 may be managed by the data management service 306. For example and without limitation, in some embodiments, the data management service 306 may manage access to the data stores 302 by various parties (e.g., connected devices 300, data consumers 316, applications 318, and/or data controllers and/or manipulators 320) via API calls issued to the data management service 306.

Data controllers and/or manipulators 320 may communicate with the data management service 306 to send commands and/or other messages to one or more connected devices 300 which, depending on the nature of the commands and/or messages, may be acted upon by the connected devices 300. Consistent with embodiments disclosed herein, the sending of commands to connected devices 300 may be governed by the data management service 306. For example, in some embodiments, the data management service may leverage the IAM service 308 to ensure that rules and/or policies established by EPN administrators 322 are enforced. In some embodiments, the IAM service 308 may leverage one or more external identity providers 304 to support single sign on ("SSO") and/or external authentication if the EPN ecosystem is configured to allow such external authentication.

Data consumers 316, applications 318, and/or data controllers and/or manipulators 320 may, in accordance with rules and/or policies established by EPN administrators 322, may deploy programs within a TEE 312 of the data management service 306. The TEE 312 may, among other things, prevent the export outside of the TEE 312. Programs running in the TEE 312 may, for example and without limitation, analyze, enhanced, and/or augment the data associated with the connected devices 300 and, in some instances, create derived data based on the ingested data. In some embodiments, the programs may allow authorized data consumers 316 to access originate, derived, and/or augmented data via one or more APIs exposed by the data management service 306 and/or the programs themselves.

A data virtualization service 310 of the data management service 306 may manage data sets and/or data sources (e.g., internally managed and/or in external data stores 302). Consistent with embodiments disclosed herein, access may be governed to those data sets and/or data stores 302 using rules enforced by the data virtualization service 310 and/or the data management service 306 with the assistance of the IAM service 308.

The data management service may further comprise an audit service 314. In some embodiments, the audit service 314 may manage a trusted log of all accesses to data and/or commands associated with the connected devices 300. The trusted log may further include indications of received queries and/or commands specified by data consumers 316, applications 318, and/or data controllers and/or manipulators 320.

Connected Device Control Using Explicit Private Network Techniques

Figure 4:
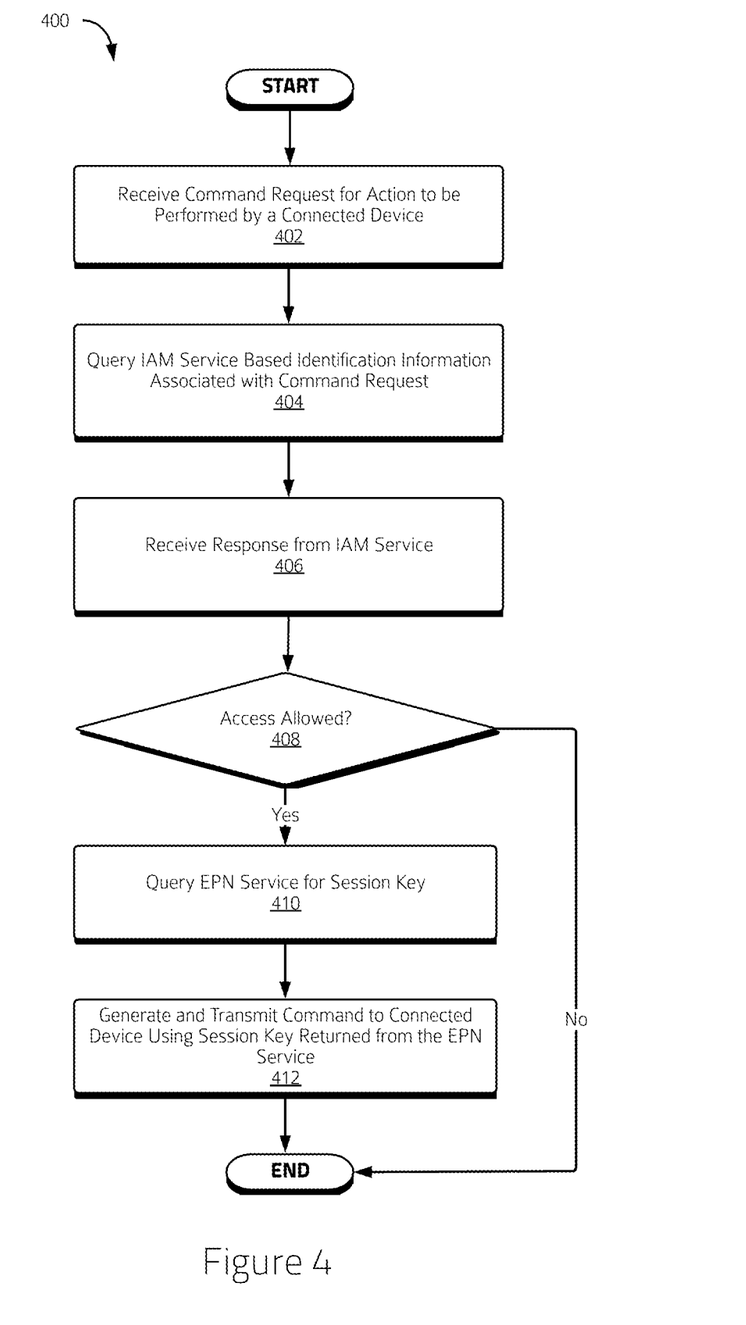
FIG. 4 illustrates a flow chart of a non-limiting example of a method for managing a connected device in an explicit private network ecosystem consistent with certain embodiments disclosed herein.

FIG. 4 illustrates a flow chart of a non-limiting example of a method 400 for managing a connected device in connection with an EPN ecosystem consistent with certain embodiments disclosed herein. The illustrated method 400 may be implemented in a variety of ways, including using software, firmware, hardware, and/or any combination thereof. In certain embodiments, various aspects of the illustrated method 300 and/or its constituent steps may be performed by a cloud service system configured to allow a user and/or an associated application and/or system to interact with one or more connected devices, and/or any other suitable device, system, and/or service and/or combination of devices, systems, and/or services.

At 402, a device command request may be received from the cloud service system. In some embodiments, the device command request may be received from an application associated with a user over a trusted and/or otherwise secure network connection. For example, and without limitation, the device command request may be received over a network communication channel secured by TLS.

The device command request may comprise a variety of information. For example, in certain embodiments, the device command request may comprise requestor identification information that may identify a requesting user, application, and/or system and can be used in authenticating such identity with an IAM service managing access control and/or associated privileges, permissions, and/or restrictions. In some embodiments, the requestor identification information may comprise an access token (e.g., an access token issued by an associated IAM service). In further embodiments, the device command request may further comprise connected device identification information and an indication of a requested action to be performed by the connected device.

An access authorization query may be issued to an IAM service at 404. In certain embodiments, the access authorization query may comprise the requestor identification information. The access authorization query may, in some implementations, further include the connected device identification information and/or the identification of the requested action.

At 406, a response may be received from the IAM service based on the access authorization query. In some embodiments, the response may validate the requestor identification information. For example and without limitation, the response may validate token information provided to the IAM service by the cloud service system as part of the access authorization query. In further embodiments, the response may comprise information providing at least one privilege, rule, and/or restriction associated with controlling at least one operation of a connected device associated with the connected device identification information.

At 408, it may be determined whether an account associated with the requestor identification information (e.g., an account associated with the requesting application, system, and/or associated user) is permitted to perform the requested device action on the connected device. In some embodiments, this determination may be based on the at least one privilege, rule, and/or restriction returned by the IAM service and the indication of the requested device action included in the device command request. If the action is not permitted, the method 400 may proceed to terminate and/or an indication of a failed may be returned to the requesting system. If the requested action is permitted, the method may proceed to 410.

At 410, a first EPN key query may be issued to an EPN service (e.g., an EPN secrets manager service). In some embodiments, the EPN key query may comprise the connected device identification information (e.g., an identification token and/or the like). The EPN service may, among other things, manage a key association table associating one or more connected devices registered with the EPN service with one or more EPN session keys. The session key may comprise, for example and without limitation, a device session key and/or a group session key. The EPN service may respond to the query with a session key associated with the connected device identification information (assuming that an active session key is included in the key association table associated with the EPN service).

A cloud service system may generate a connected device command at 412 configured to direct the connected device to perform the requested action indicated in the device command request. In some embodiments, the connected device command may be signed and/or encrypted using the session key provided by the EPN service. The cloud service system may transmit the generated connected device command to the connected device via a connection that is not necessarily trusted.

In some embodiments, the method 400 may further comprise a command acknowledgement process. For example, the connected device may communicate to the cloud service system an acknowledgement that a command was received and/or otherwise successfully acted upon by the connected device. In some embodiments, the cloud service system may verify that a session key used to sign and/or otherwise encrypt an acknowledgement from the connected device is active and/or otherwise not expired (e.g., by querying the EPN service to verify the expiration status of the session key).

It will be appreciated that embodiments of the disclosed systems and methods may be employed in connection with a variety of connected devices and/or associated networks and/or ecosystems. For example and without limitation, embodiments may be employed in deployments of IoT devices and/or sensors that collect data and send that data to one or more cloud data repositories, proprietary databases, data analytics providers, etc. for storage and or processing. Similar non-limiting examples also occur within specialized industrial applications such as distributed manufacturing management and control systems and/or smart grid management and control systems, where IoT sensors and/or actuators are widely deployed and collect operational and/or environmental data that may be sent to various disparate and/or competing systems for storage and/or analysis.

Moreover, it will be appreciated that embodiments of the disclosed systems and methods may be employed in a variety of applications, contexts, and/or use cases, which in some implementations may involve various aspects and/or constituent steps of the method 400 illustrated in connection with FIG. 4. For example and without limitation, and as detailed herein, embodiments of the disclosed systems and methods may allow for users to query data generated by a connected device which has been ingested in a TSDB, users to administer and/or configure connected devices and/or device groups, programs (which may be executing in a secure environment) to query data stored in a TSDB managed by a service and to generate derived data and/or models from the queried data, connected devices to ingest data into a TSDB managed by a service, and/or the like.

Connected Device Management Using Digital Twins

As detailed above, in some embodiments, digital twins may be used to configure and/or otherwise manage security associations and/or state information for connected IoT devices. For example and without limitation, digital twins may be used to initialize and/or configure security associations and/or key exchange protocols including, for example and without limitation, symmetric key and/or other key exchange protocols. Authenticated key exchange may be performed using a variety of methods and/or suitable techniques, some which may include group keys (e.g., as may be the case in a local network).

Consistent with embodiments disclosed herein, as a trusted entity in the application cloud, a digital twin may allow for trusted services to update and/or offer:

Keys used for authentication, data integrity, and/or confidentiality.

A trusted environment to update device configurations.

A reference monitor for remediation of a device back to a known good state.

Various embodiments disclosed herein may facilitate attestation for anti-cloning. For example, a secret may be embedded in a device and maintained in the digital twin for the lifetime of the device. This secret may be used to prove uniqueness of the device, for example, with an HMAC of the immutable device identity using session keys.

Data Protection from Sensor Edge to Cloud Services

Unlike certain conventional techniques for protection of data (e.g., using TLS or VPN), EPN techniques disclosed herein may in some implementations offer end-to-end data integrity, authentication, and/or data confidentiality of all data from its generation at the edge to consumption in an application (e.g., a cloud and/or mobile application). Various embodiments that implement an EPN architecture disclosed herein may provide for persistent data protection ("PDP") to ensure data integrity, authenticity, and/or optionally secrecy protection, both at rest as well as in transit even as it travels across potentially untrusted gateways and networks.

In various embodiments, EPN techniques may be used to sign and, optionally, encrypt data when it is generated on a device. Similar protections may be provided for data sent to a device (e.g., when commands are sent to a device). In certain embodiments, a PDP protection layer implemented by EPN techniques may co-exist with network security measures like VPN but may continue to provide protection after a VPN pipe has delivered its content to a VPN gateway as well as when the data is at rest.

Consistent with embodiments disclosed herein, EPN clients (e.g., EPN SDK implementations) may be installed on each end point. In some embodiments, an EPN client may be configured to ensure that sensitive processing and/or operations are performed in a TEE and/or another secure processing environment, with sensitive cryptographic key material being stored in a secure storage.

In certain embodiments, the device software may be expected to be digitally signed so only known trusted software will be running on an end point. This may be verified by a trusted boot process at startup. An EPN client may rely on the secure foundations of a TEE and/or trusted storage and/or trusted boot to ensure the resilient protection of data. In some embodiments, these foundations may be enabled through a combination of key infrastructure toolsets and integration with the hardware security of the associated hardware and/or device components.

In at least one non-limiting example, a connected device may comprise an analog sensor. When analog inputs are sensed by a sensor, the input may be processed by an analog-to-digital converter ("A/D"). When the digital data is generated, an EPN client may access a buffer with the data and may sign it using the EPN session keys associated with a particular trusted key space. Signing may ensure the authenticity of the data originating from the specific end point (e.g., using keyed hash and/or HMAC authenticity verification techniques). In some embodiments, through the use of a hashing operation, the data's integrity throughout its journey may also be verifiable. Optionally, the EPN client may also encrypt the data to maintain data secrecy. Since many connected devices may be performance and/or resource constrained, EPN techniques consistent with embodiments disclosed herein may leverage AES symmetric key ciphers. These ciphers may be agreed upon between the client and server using, for example and without limitation, the Diffie-Hellman STS protocol, so secrets need may not need be distributed.

In some embodiments, EPN packages may comprise routing data for a consuming server that may function as EPN end point. When the server receives an EPN package, the server may perform a HMAC verification to validate the authenticity and/or integrity data packets in the package. If encryption was applied, the server may decrypt the data. Further distribution, collaboration and sharing of the data is managed using other data access control features of a service offered by the server.

In the above manner, EPN's focus on data authenticity and data integrity consistent with embodiments disclosed herein may provide persistent protection of data through networks and/or across gateways and/or routers that are not trusted. EPN techniques may ensure data from IoT devices can be trusted, and this trust can be maintained throughout its journey including when commands and other data are sent to actuators.

Connected Device Personalization

As discussed above, a certificate authority may offer a personalization service that issues trusted credentials (e.g., certificates, certificates and keys, and/or some other trusted assertions). A certificate authority service may also issue symmetric keys bound to a device identity. In some embodiments, the derivation function used to generate and/or otherwise issue keys may be maintained securely.

A client SDK aware of the personalization service may be implemented that may, for example and without limitation:

Engage in personalization protocols with a certificate authority and/or provide secure storage of secrets and credentials.

Provide an API for device owners to invoke the above and to use the credentials and keys to establish secure connections to some endpoints, and potentially get more application specific secure data from there (e.g., trust anchors for backend services) and/or encrypt data to be transmitted over some communication channel and wrap this data in a way that the recipient can trust its integrity/confidentiality.

The personalization service may accept requests from authenticated and/or authorized callers to reveal some of the data issued to specific devices, such as a symmetric key that encrypts the data.

Various embodiments may provide for device and/or personality management functionality. This may include, for example and without limitation, updating device configuration (e.g., sensor polling frequency, connectivity to other devices at the edge (P2P), etc.), pushing firmware updates (e.g., signed firmware updates), updating and/or replacing keys, revoking a device and/or otherwise removing it from the network, provisioning a secret to be used for device attestation (anti-cloning) (e.g., HMAC using session keys and device identity), and/or the like.

In certain embodiments, lightweight high performance data protection may be implemented (e.g., data integrity, authentication, and optionally confidentiality), provided with DUPKT keys and/or HMACs on data. Various embodiments may allow for updating of configurations and/or sending commands to a device (e.g., update configuration—changing sensor reading intervals) and/or sending instructions for actuators (e.g., changing the rotational velocity in a windmill).

Data-Centric Security from Named Data Networking

Certain embodiments may implement named data network ("NDN") and/or aspects thereof. In certain NDN implementations consistent with aspects of the disclosed embodiments, data may be signed together with its name to generate a secure binding. The signature and/or associated data publisher information may be used in connection with data provenance determinations. For example and without limitation, in some embodiments implementing NDN techniques, a data consumer may make context-specific determinations regarding a particular public key to determine whether it associated with an entity trusted with publishing specific data. In some implementations, keys may be packaged as NDN data. Applications may manage access to data by encrypting data and distributing associated keys as NDN data.

In certain embodiments, certificate authority functionality and/or personalization and/or key stewardship services may be provided standalone (e.g., not necessarily integrated with a trusted data management service). In some embodiments, some of the rules and/or policies may be reflected on the client, cryptographically verified by the client through its available certificates. In a non-limiting example, if an authorized user obtains a ticket from a trusted service that shows the user is allowed to adjust the windmill pitch directly from their phone, the windmill can verify the ticket presented by the user, even without having an Internet connection.

Server applications may be authenticated using an IAM protocol. In certain implementations, once in TSDB, data may not need to be protected through session key derived keys, so the server application can process data without necessarily having access to the session keys In at least one non-limiting example, a data management process may comprise one or more of the following:

(1) A user may log into the client application (browser, smartphone application).

(2) Authenticate the server application using the user identity:
  Credentials for this may be provided by a certificate authority.
  The server application may use IAM services to authenticate the data management platform, thereby providing appropriate roles to the data management platform for identifying how to expose data in a secure execution environment.

(3) The authenticated identity may be used to lock in permissions to the tagged data. Tagged data may comprise the metadata generated by the client in the message package to specify digital rights management style context that may include, for example and without limitation:
  Who has the right to access, location (e.g., latitude and/or longitude) where the data was generated, which may comprise more course data (e.g., cell sector ID) for a user, more fined grained data (e.g., GPS data), etc.
  When data may be accessed (e.g., time windows), enabling data expiry and/or "try before you buy" data access scenarios.

(4) Encrypted data from the edge may be decrypted in the TSDB and then governed by a trusted service and access then regulated by a secure execution environment.

(5) Trust association may be managed by a real time service. This may include, for example and without limitation, key management per device, key refresh, updated metadata generation, and/or the like. In some embodiments, trusted ledgers may be used to maintain effective and relatively lightweight distributed permissions.

Image Verification and Signing

Various embodiments of the disclosed systems and methods may support image verification and/or signing. In some embodiments, this may be performed at firmware update and/or bootup times. A boot loader may be verified by the platform. The boot loader may use a client SDK to verify a kernel image and may transfer control to the kernel image. In some embodiments, the kernel may use the client SDK to verify the application image and/or transfer control to the application. The application may use the client SDK APIs for other interactions over secure channels, using secure messages, and/or using keys from a non-volatile key store on the system.

System and Service Architecture

Figure 5:
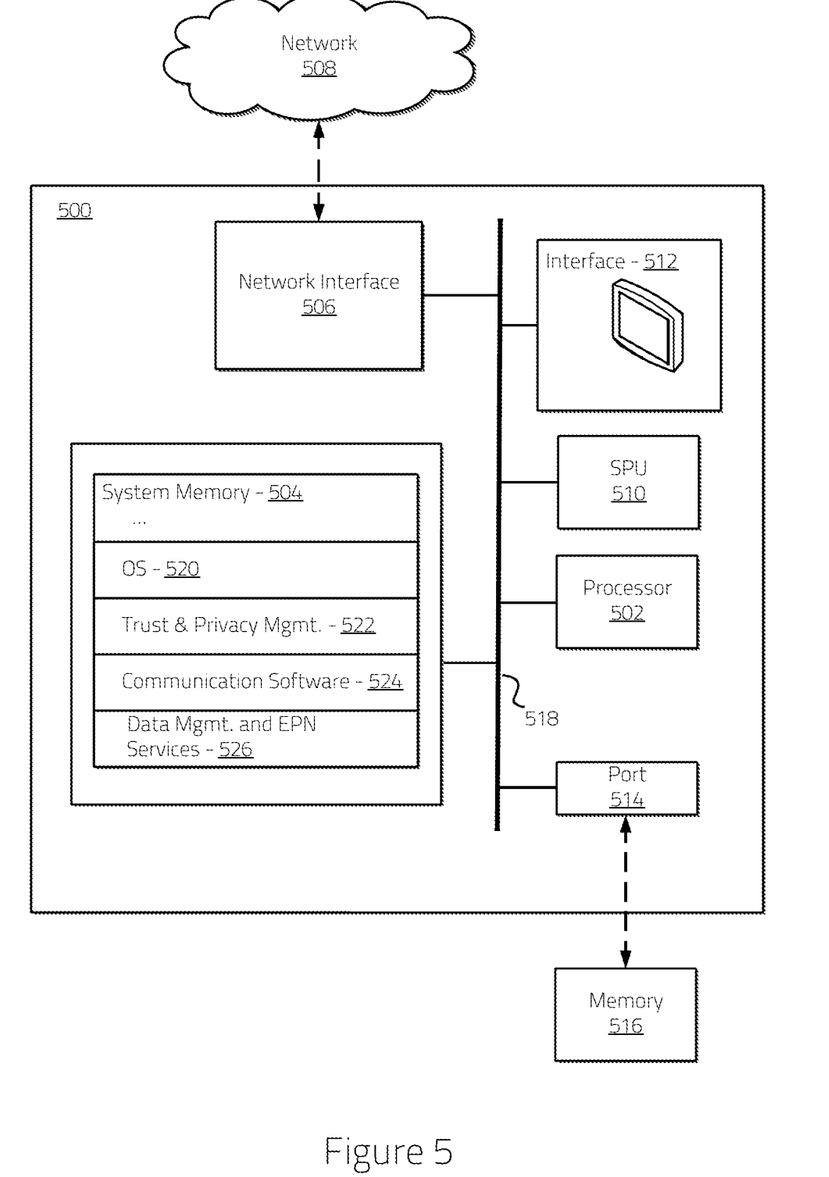
FIG. 5 illustrates an example of a system that may be used to implement certain embodiments of the systems and methods of the present disclosure.

FIG. 5 illustrates an example of a system 500 that may be used to implement certain embodiments of the systems and methods of the present disclosure. The various systems, services, and/or devices used in connection with aspects the disclosed embodiments may be communicatively coupled using a variety of networks and/or network connections (e.g., network 508). In certain embodiments, the network 708 may comprise a variety of network communication devices and/or channels and may utilize any suitable communications protocols and/or standards facilitating communication between the systems and/or devices.

The network 508 may comprise the internet, a local area network, a virtual private network, and/or any other communication network utilizing one or more electronic communication technologies and/or standards (e.g., Ethernet or the like). In some embodiments, the network 508 may comprise a wireless carrier system such as a personal communications system ("PCS"), and/or any other suitable communication system incorporating any suitable communication standards and/or protocols. In further embodiments, the network 508 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), time divisional multiple access ("TDMA"), long-term evolution ("LTE"), orthogonal frequency-division multiplexing ("OFDM"), and/or the like. In certain embodiments, the network 508 may incorporate one or more satellite communication links. In yet further embodiments, the network 508 may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. In some embodiments, the secure processing unit may provide and/or otherwise implement a TEE. The systems and/or devices may further comprise software and/or hardware configured to enable electronic communication of information between the devices and/or systems via a network using any suitable communication technology and/or standard.

As illustrated in FIG. 5, the example system 500 may comprise: a processing unit 502; system memory 504, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 502; a port 514 for interfacing with removable memory 516 that may include one or more diskettes, portable storage mediums (e.g., flash memory, thumb drives, USB dongles, compact discs, DVDs, etc.) and/or other non-transitory computer-readable storage mediums; a network interface 506 for communicating with other systems via one or more network connections and/or networks 508 using one or more communication technologies; a user interface 512 that may include a display and/or one or more input/output devices such as, for example, a touchscreen, a keyboard, a mouse, a track pad, and the like; and one or more busses 518 for communicatively coupling the elements of the system 500.

In some embodiments, the system 500 may, alternatively or in addition, include an SPU 710 that is protected from tampering by a user of the system 500 or other entities by utilizing secure physical and/or virtual security techniques. An SPU 510 can help enhance the security of sensitive operations such as personal information management, trusted credential and/or key management, privacy and policy management, and other aspects of the systems and methods disclosed herein. In certain embodiments, the SPU 510 may operate in a logically secure processing domain and be configured to protect and operate on secret information, as described herein. In some embodiments, the SPU 510 may include internal memory storing executable instructions or programs configured to enable the SPU 510 to perform secure operations, as described herein.

The operation of the system 500 may be generally controlled by the processing unit 502 and/or an SPU 510 operating by executing software instructions and programs stored in the system memory 504 (and/or other computer-readable media, such as removable memory 516). The system memory 504 may store a variety of executable programs or modules for controlling the operation of the system 500. For example, the system memory may include an operating system ("OS") 520 that may manage and coordinate, at least in part, system hardware resources and provide for common services for execution of various applications and a trust and privacy management system 522 for implementing trust and privacy management functionality including protection and/or management of personal data through management and/or enforcement of associated policies. The system memory 504 may further include, without limitation, communication software 524 configured to enable in part communication with and by the system 500, one or more applications, data management and/or EPN services modules) 526 configured to implement various aspects of the disclosed systems and/or methods, and/or any other information and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, systems, services, and/or components presented in connection with the figures and/or associated description within the scope of the inventive body of work, and that the examples presented in the figures and described herein are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for managing data performed by a cloud service system comprising a processor and a non-transitory computer-readable storage medium storing instructions that, when executed by the processor, cause the cloud service system to perform the method, the method comprising:
  receiving, from an application associated with a user over a first trusted network connection, a device command request, the device command request comprising requestor identification information, connected device identification information, and an indication of a requested device action;
  issuing an access authorization query to an identity and access management service, the access authorization query comprising the requestor identification information;
  receiving, from the identity and access management service in response to the access authorization query, a response validating the requestor identification information and providing at least one privilege associated with controlling at least one operation of a connected device associated with the connected device identification information;
  determining, based on the at least one privilege and the indication of the requested device action, that an account associated with the requestor identification information is permitted to perform the requested device action;

issuing, to an explicit private network service via a second trusted network connection, an explicit private network key query, the explicit private network key query comprising the connected device identification information;

receiving, from the explicit private network service in response to the explicit private network key query, a session key associated with a connected device associated with the connected device identification information;

generating a connected device command, wherein generating the connected device command comprises performing at least one cryptographic operation using the session key; and transmitting, via an untrusted network connection to the connected device, the connected device command.

2. The method of claim 1, wherein the requestor identifier comprises identification information associated with the user.

3. The method of claim 1, wherein the requestor identifier comprises identification information associated with the application.

4. The method of claim 1, wherein the requestor identifier comprises identification associated with a system executing the application.

5. The method of claim 1, wherein the requestor identifier comprises an access token.

6. The method of claim 5, wherein the requestor identifier is issued by the identity and access management service to a system executing the application.

7. The method of claim 1, wherein the session key comprises a device session key.

8. The method of claim 1, wherein the session key comprises a group session key.

9. The method of claim 1, wherein the connected device comprises one or more of a computer system, a smartphone, a tablet computing system, a security system, a vehicle infotainment system, a streaming media device, a gaming device, an entertainment system, a networked lock, a connected thermostat, a connected furnace, a connected air conditioning system, an irrigation system, a water control system, a pump system, a utility meter, a network gateway, an activity sensor, a home alarm, a connected appliance, a connected vehicle, a mobile communication device, a wind turbine system, a solar panel system, and an industrial manufacturing control system.

10. The method of claim 1, wherein the cryptographic operation comprises encrypting the connected device command with the session key.

11. The method of claim 1, wherein the cryptographic operation comprises cryptographically signing at least a portion of the connected device command with the session key.

12. The method of claim 1, wherein the method further comprises receiving, from the connected device via an untrusted network connection, a command acknowledgement indicating that the connected device performed the requested device action.

13. The method of claim 12, wherein the method further comprises issuing, to the explicit private network service via the second trusted network connection, a subsequent explicit private network key query, the subsequent explicit private network key query comprising the connected device identification information.

14. The method of claim 13, wherein the method further comprises receiving, from the explicit private network service in response to the subsequent explicit private network key query, a subsequent session key associated with the connected device associated with the connected device identification information.

15. The method of claim 14, wherein the session key and the subsequent session key are the same session key.

16. The method of claim 15, wherein the method further comprises validating the command acknowledgement using the subsequent session key.

* * * * *